(12) United States Patent
Greene

(10) Patent No.: US 9,470,587 B1
(45) Date of Patent: Oct. 18, 2016

(54) SOLID THERMAL SIMULATOR SENSING DEVICE

(71) Applicant: Cooper-Atkins Corporation, Middlefield, CT (US)

(72) Inventor: John Patrick Greene, Eau Claire, WI (US)

(73) Assignee: COOPER-ATKINS CORPORATION, Middlefield, CT (US)

( * ) Notice: Subject to any disclaimer, the term of this patent is extended or adjusted under 35 U.S.C. 154(b) by 491 days.

(21) Appl. No.: 13/969,141

(22) Filed: Aug. 16, 2013

(51) Int. Cl.
*G01K 1/00* (2006.01)
*G01K 15/00* (2006.01)

(52) U.S. Cl.
CPC .................................. *G01K 15/005* (2013.01)

(58) Field of Classification Search
USPC .................... 374/1, 208, 11, 102, 108, 134
See application file for complete search history.

(56) References Cited

U.S. PATENT DOCUMENTS

| | | | |
|---|---|---|---|
| 2,923,786 A | 2/1958 | Jones | |
| 3,964,313 A | 6/1976 | Connick | |
| 4,003,124 A | 1/1977 | Connick | |
| 5,004,355 A | 4/1991 | Ryan | |
| 5,219,225 A * | 6/1993 | Ball | G01K 15/002 374/1 |
| 6,663,277 B1 * | 12/2003 | Sandmæl | G01K 15/00 374/1 |
| 6,779,918 B2 * | 8/2004 | Gatling | F25D 29/00 236/51 |
| 7,607,399 B2 * | 10/2009 | Mack | D05C 9/04 112/103 |
| 8,851,744 B1 * | 10/2014 | Feller | G01K 15/005 374/1 |
| 2007/0291814 A1 * | 12/2007 | Hirst | G01K 15/005 374/1 |
| 2009/0003406 A1 * | 1/2009 | Sjogren | H01H 69/01 374/1 |
| 2010/0103975 A1 * | 4/2010 | Harslund | G01K 15/00 374/1 |

OTHER PUBLICATIONS

Cooper-Atkins Corporation, "The SOLID Simulator", Jan. 2011.
Cooper-Atkins Corporation, "TempTrak (TM) by Cooper-Atkins(R) New Solid Product Simulator", Jan. 2011.

* cited by examiner

*Primary Examiner* — Mirellys Jagan
(74) *Attorney, Agent, or Firm* — Thomas G. Ference

(57) ABSTRACT

A solid thermal simulator sensing device, the device can simulate and sense the thermal characteristics of a perishable element and is easily calibrated to a verifiable standard. The device is fabricated from a single piece of solid material sized to have a thermal mass substantially equal to that of said perishable element. A sensing channel is located within the single piece of solid material. The sensing channel extends from one end towards the center. A temperature sensor is mounted within the sensing channel. The thermal response time of the device is slowed by the single piece of solid material to mimic the thermal properties of the perishable element. A calibration channel is extends from the outer surface of the device to a point adjacent the temperature sensor. A calibration probe may be inserted into the calibration channel to quickly verify the accuracy of the device.

15 Claims, 7 Drawing Sheets

SOLID THERMAL SIMULATOR SENSING DEVICE

FIELD

The present invention generally relates to a temperature sensing device. More specifically it relates to a solid thermal simulator sensing device that has the ability to simulate and sense the thermal characteristics of a perishable element and also be easily calibrated to a verifiable standard.

BACKGROUND

Monitoring the temperature over time for a temperature-sensitive, perishable element is important to accurately determine its lifetime and decide when the perishable element should no longer be used and therefore disposed of. Perishable elements may include certain foods, drugs, biological specimens and materials that age as a function of time and temperature. Being able to accurately determine the thermal history of a perishable element over time is necessary in the food industry to prevent people from getting sick or dieing from expired food. The effectiveness of some drugs and materials also decreases over time and their continued use beyond a suggested lifetime may lead to detrimental effects contraindicated to their intended use. On the other hand, disposing of a perishable element before necessary may lead to throwing away inventory that may have significant monetary value. It is therefore important to have an accurate thermal history of what the perishable element actual sees over time to both minimize risk and save money.

The problem with accurately monitoring the temperature history that a perishable element sees, say in a cold refrigerator or freezer, is that the air temperature within the refrigeration unit changes dramatically each time the door is opened. The air temperature may change by tens to hundreds of degrees with each opening depending on the difference between the inside and outside temperature. The perishable element, however, because of its thermal mass and insulating properties may have its temperature change by only a few degrees during each exposure. Recording just the temperature changes of the air within the refrigerator over time will therefore over estimates the time-temperature exposure for the perishable element. This may lead to the perishable element being disposed before it needs to be and will result in throwing perfectly good product away.

To better characterize the temperature of a perishable device over time, a variety of perishable element simulating and sensing devices have been developed. One example is a bottle filled with liquid that has a thermometer, such as H-B Instrument's DURACPLUS® bottle thermometers. These thermometers insulate the sensing part of the thermometer with a liquid such as glycol. These products require visual reading that are subject to user error and may be easily broken if dropped. Also, any liquids that may leak from the bottle may contaminate nearby perishable elements. Another example is illustrated in U.S. Pat. No. 3,964,313 to Jones where a food can of the same composition and physical dimensions as the container of food usually stored in the container is filled with a porous open cell material distributed with a liquid to simulate the food. These types of simulators again use liquids, require complex fabrication techniques and are cumbersome to use. It is therefore apparent that the thermal monitoring industry would benefit from more accurate, durable and simpler thermal simulators.

Another issue with monitoring the temperature over time for a temperature-sensitive, perishable element is whether the monitoring sensing device itself is calibrated and reading properly. Sensing devices need to be checked periodically over time to insure that during the period of operation, they were actually taking proper measurements. Depending on the application and industry, calibration monitoring may need to take place every couple weeks to every several months. Having to remove, calibrate and reinstall monitoring sensing devices on a regular basis can become a very time consuming and costly endeavor. In situ calibration is best, but current state of the art solid thermal simulator sensing devices do not have that capability.

The present invention provides for a thermal device that simulates a perishable element and allows the user to more accurately monitor the perishable element's temperature over time. The thermal device is durable and safe. The thermal device is also structured to facilitate in situ calibration that requires minimal time and effort.

SUMMARY

One aspect of the present invention is directed to a thermal device for simulating the thermal characteristics of a perishable element, comprising a single piece of solid material. The single piece of solid material has an outer radius, a sensor end, a calibration end, a longitudinal axis and a center. A sensing channel is located along the longitudinal axis within the single piece of solid material. The sensing channel extends from one opposing end towards the center. A temperature sensor having a thermal response time is mounted within the sensing channel. A calibration channel is located parallel to the single piece of solid material. The calibration channel extends from the calibration end towards the center of the single piece of solid material. The calibration channel terminates proximate the temperature sensor. The thermal response time of the temperature sensor mimics the thermal characteristics of the perishable element. The single piece of solid material has a thermal mass substantially equal to that of the perishable element.

Another aspect of the present invention is directed to a method of forming a thermal device for simulating and sensing the thermal characteristics of a perishable element comprising, providing a single piece of solid material and a temperature sensor having communication leads. The method includes machining the single piece of solid material into a generally cylindrical structure having an outer radius, a sensing end, a calibration end, a longitudinal axis and a center. The method includes creating a sensing channel extending from sensing end towards the center along the longitudinal axis and a calibration channel extending from said calibration end towards the center parallel to the longitudinal axis. The method further includes securing the temperature sensor internal the sensing channel.

Still another aspect of the present invention is directed to a method of calibrating a thermal device for simulating the thermal characteristics of a perishable element in a surrounding atmosphere having an ambient temperature comprising, providing a single piece of solid cylindrical material sized to have a thermal mass substantially equal to that of the perishable element and a calibration probe. The single piece of solid material has an outer surface, a centrally located temperature sensor with communication leads exiting the surface, and a calibration channel extending from the surface to a test point within the single piece of solid material. The test point is adjacent the temperature sensor. The method includes inserting the calibration probe into the calibration channel to the test point and allowing a sufficient amount of time for the ambient temperature to equilibrate. The method further includes comparing a temperature output from the temperature sensor to a temperature output from the calibration probe to determine the accuracy of the temperature sensor.

BRIEF DESCRIPTION OF DRAWINGS

The foregoing and other aspects and advantages of the invention presented in this disclosure will be apparent from the following detailed description, as illustrated in the accompanying drawings, in which:

FIG. 3b is a side, sectional view along line 3b-3b of the thermal device in FIG. 3a;

FIG. 3c is a top, sectional view along line 3c-3c of the thermal device in FIG. 3a;

FIG. 4b is a side, sectional view along line 4b-4b of the thermal device in FIG. 4a;

DETAILED DESCRIPTION

Figure 1:
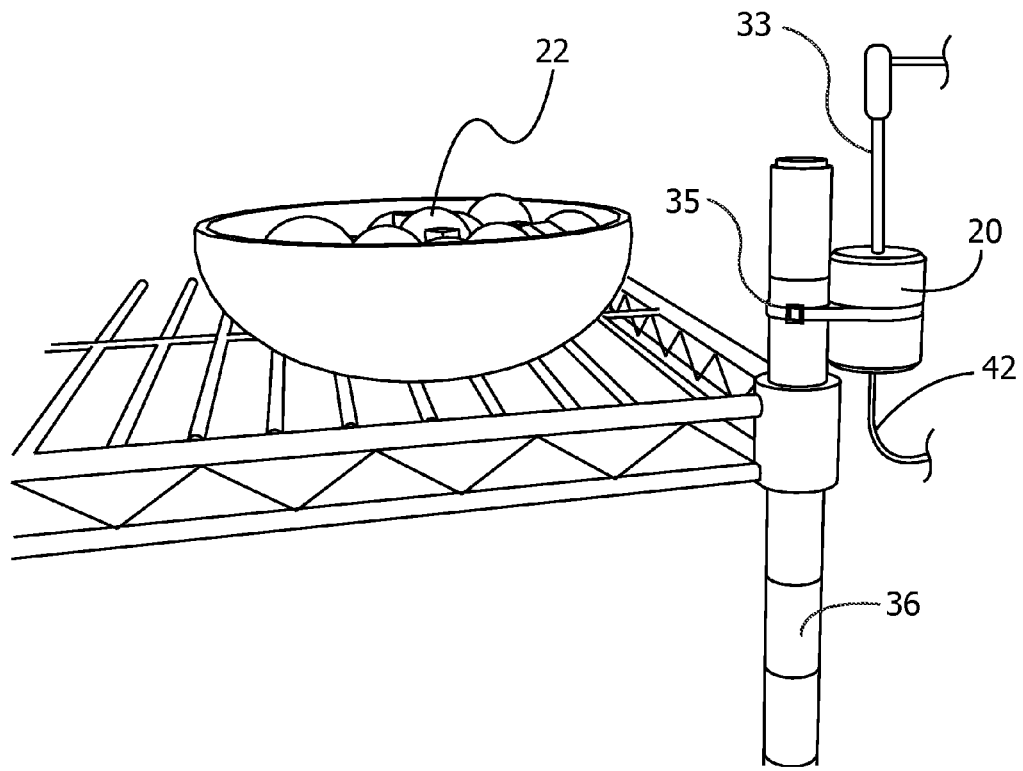
FIG. 1 is a perspective view of one embodiment of a thermal device according to the present invention shown in an exemplary use environment where the thermal device is attached to a support for monitoring the thermal history of a perishable element and also having a calibration probe inserted to calibrate the thermal device.
Figure 2:
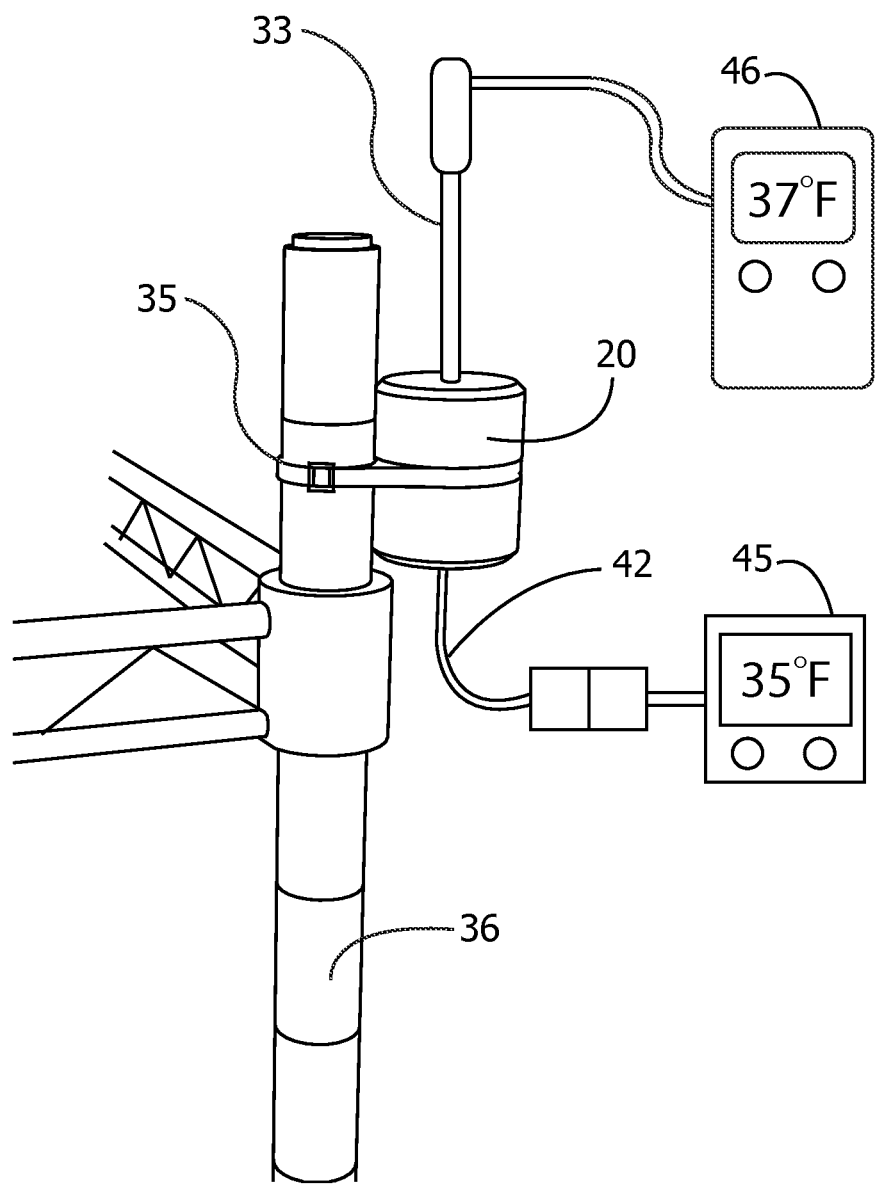
FIG. 2 is a perspective view of the thermal device in FIG. 1, further showing temperature read out devices used in the calibration procedure.

Thermal device 20 (a.k.a. solid thermal simulator sensing device or solid simulator), for simulating and sensing the thermal characteristics of a perishable element 22, is shown in FIGS. 1-4b. Thermal device 20 comprises a single piece of solid material 24 having an outer surface 23, a center, an outer radius 25, two opposing ends (calibration end 26a and sensor end 26b), and a longitudinal axis 28. Single piece of solid material 24 is preferably a single piece of solid cylindrical material. Single piece of solid material 24 is also preferably an NSF (National Sanitation Foundation), FDA (Food and Drug Administration) and USDA (United States Department of Agriculture) approved material that can be used in close proximity to food, drugs and biological specimens. Single piece of solid material 24 is sized to have a thermal mass substantially equal to that of perishable element 22 that it is monitoring. A sensing channel 30 is located along longitudinal axis 28 within single piece of solid material 24. Longitudinal axis 28 is preferably located along the center line of said single piece of solid material. Sensing channel 30 extends from sensor end 26b towards the center of single piece of solid material 24. A temperature sensor 32 is mounted within sensing channel 30 of said single piece of solid material 24. Temperature sensor 32 is preferably mounted near the center of said single piece of solid material.

Thermal device 20 further comprises a calibration channel 31 extending from outer surface 23 to a test point within single piece of solid material 24. Calibration channel 31 is preferably located parallel to the longitudinal axis 28 and extends from calibration end 26a towards the center of the single piece of solid material 24. Calibration channel 31 terminates proximate temperature sensor 32. Calibration channel 31 is for accepting a calibration probe 33, FIG. 2. Calibration probe 33 may be a calibration probe such as COOPER-ATKINS® thermocouple instrument and probe model 35140. Calibration probe 33 is calibrated to a verifiable standard such as a NIST (National Institute of Standards and Technology) standard. Calibration probe 33 may be connected to a transmitter system 46 that uploads data to data storage unit to record and compare temperature calibration data. Transmitter system my transmit by wired or wireless communication the calibration data to the data storage unit.

Figure 3A:
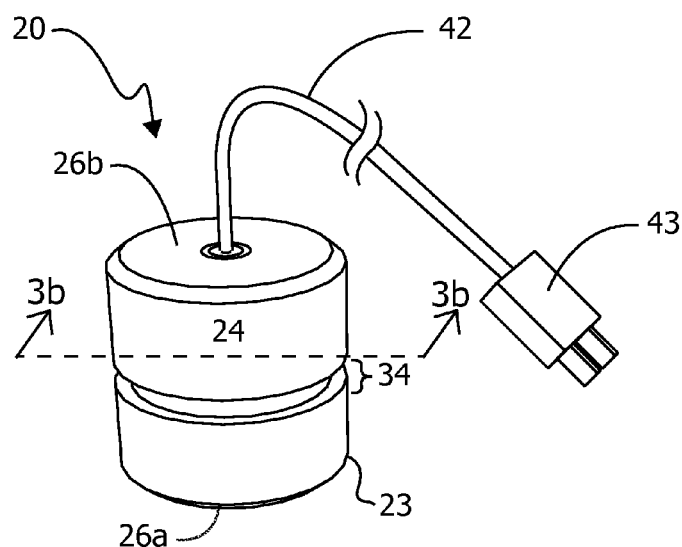
FIG. 3a is a perspective view of the thermal device in FIG. 1.
Figure 3B:
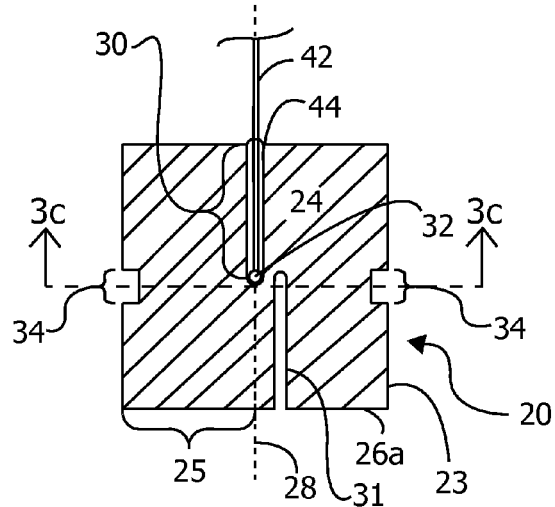
Figure 3C:
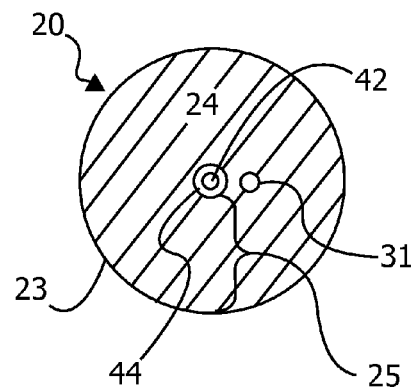

Thermal device 20 may be provided with a groove 34 that is machined within outer radius 25 for accepting a cable tie 35, FIGS. 3a and 3b. Groove 34 allows for thermal device 20 to be easily attached to support structure 36 as shown in FIG. 1. Groove 34 in combination with cable tie 35 facilitates easy placement and movement along support structure 36. Groove 34 inner dimensions are matched to be the same as the outer dimensions of cable tie 25 so that thermal device 20 does not move relative to the cable tie. This is important to allow the user to easily position thermal device 20 next to perishable element 22 and make accurate readings.

Figure 4A:
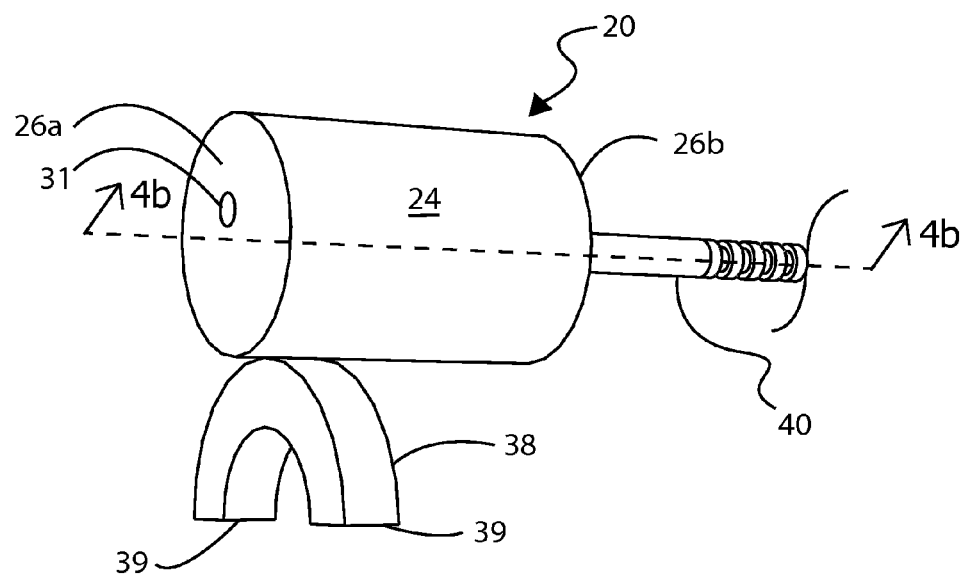
FIG. 4a is a perspective view of another embodiment of a thermal device according to the present invention.
Figure 4B:
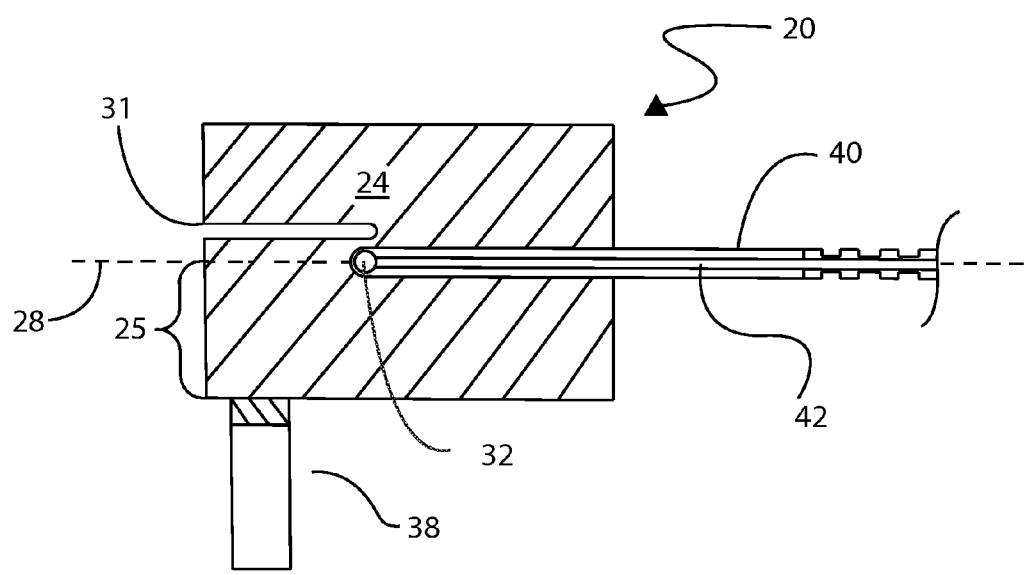

In one embodiment, FIGS. 4a and 4b, thermal device 20 may include a standoff support 38 mounted to outer radius 25 of the single piece of solid material 24. Standoff support 38 is preferably a U-shaped standoff with two external contact points 39 for contacting an external surface. This type of structure works well when thermal device 20 is integrated with a thermal probe 40 to provide a 3-point support structure for positioning the thermal device away from the walls of a freezer. The three points of support being the two external contact points 39 and where the thermal probe 40 enters sensing channel 30 of thermal device 20.

Thermal device 20 may include one or more temperature sensors 32 such as a Platinum RTD (Resistance Temperature Detector), a thermocouple, or thermistor that can measure temperature. Temperature sensor 32 may have one or more communication leads 42 that can provide power and/or electrical communication between the temperature sensor and a temperature measuring instrument. Communication leads 42 may further include a connector 43 for connecting to a temperature measuring instrument 45. Alternatively, temperature sensor 32 may be integrated with circuitry and/or power to be remotely read by a wireless temperature measuring instrument. Thermal device 20 may be connected to a transmitter system that uploads data to data storage unit to record temperature and time data. Transmitter system my transmit by wired or wireless communication the temperature data and time data to the data storage unit.

One method of fabricating thermal device 20 is to first provide a single piece of solid material 24. Single piece of solid material 24 is preferably an NSF, FDA and USDA approved material such as polyoxymethylene, polytetrafluoroethylene, or polyethylene terephthalate that can be used in close proximity to food, drugs and biological specimens. Single piece of solid material 24 is then machined to a generally cylindrical structure having a center, an outer surface, an outer radius two opposing ends (calibration end 26a and sensor end 26b) and a longitudinal axis. Single piece of solid material 24 is sized to have a thermal mass substantially equal to that of perishable element 22 that thermal device 20 will be used to monitor. A groove 34 maybe machined within outer radius 25 for accepting a cable tie 35. A sensor channel 30 is then created from sensor end 26b towards the center along the longitudinal axis. A calibration channel 31 is then created from outer surface 23 to a test point adjacent to the center of the single piece of solid material 24. Temperature sensor 32 is then secured internal to sensor channel 30 by potting the temperature sensor with a potting compound 44. Some examples of potting compound 44 are two-part thermally conductive epoxy compounds (preferably, but not limited to, THERMOSET® 340 resin and THERMOSET® No. 18 hardener by Lord Chemical Products or DURALCO® 4525 resin and hardener by Cotronics, Corp). It is preferable to secure temperature sensor 32 close to the center of thermal device 20. If communication leads 42 are connected to temperature sensor 32, the leads are positioned to extend from sensor channel 30.

Another method of fabricating thermal device 20 is to first provide a single piece of solid material 24. Single piece of solid material 24 is preferably an NSF, FDA and USDA approved material such as polyoxymethylene, polytetrafluoroethylene, or polyethylene terephthalate that can be used in close proximity to food, drugs and biological specimens. Single piece of solid material 24 is then machined into a generally cylindrical structure having a center, an outer radius, two opposing ends (calibration end 26a and sensor end 26b) and a longitudinal axis. Single piece of solid material 24 is sized to have a thermal mass substantially equal to that of perishable element 22 that thermal device 20 will be used to monitor. A sensor channel 30 is then created from one opposing end towards the center along the longitudinal axis. A calibration channel 31 is then created from outer surface 23 to a test point adjacent to the center of the single piece of solid material 24. A standoff support 38 is mounted to outer radius 25 of single piece of solid material 24. Standoff support 38 is preferably a U-shaped standoff with two external contact points 39 for contacting an external surface. Temperature sensor 32, contained within a thermal probe 44 is then press fit into sensor channel 30. Single piece of solid material 24 has a durometer sufficiently low to allow the probe to be snuggly fit within the channel. It is preferable to secure temperature sensor 32 close to the center of thermal device 20. The two external contact points of the U-shaped standoff and thermal probe 44 provide 3 points of contact for supporting thermal device 20 away from the walls of any freezer the device would be placed in.

Each temperature sensor 32 has an inherent thermal response when the temperature sensor is not surrounded by another material. However for thermal device 20, the thermal response time of temperature sensor 32 is controlled by the thermal mass of the single piece of solid material 24 surrounding the temperature sensor. Thermal mass of the single piece of solid material 24 is governed by the material's specific heat capacity and density. High specific heat and high density provide a material with more thermal mass and therefore allow a smaller single piece of solid material 24 to be used to simulate a perishable element 22. Polyoxymethylene, polytetrafluoroethylene, or polyethylene terephthalate provide a sufficiently high thermal mass to make compact thermal devices 20 that mimic perishable elements 22.

The dimensions of outer radius 25 are critical for determining the overall thermal mass provided by thermal device 20. As the outer radius 25 of single piece of solid material 24 approaches the same outer dimensions of temperature sensor 32 (i.e., the single piece of solid material becomes thinner until it disappears), the thermal response time of the thermal device 20 approaches that of the inherent thermal response time of temperature sensor 32. However, as outer radius 25 of the single piece of material is made larger the thermal response time of temperature sensor 32 can be slowed to mimic the thermal properties of perishable element 22. For most perishable elements 22 that are sized to be hand transported, thermal response time of thermal device 20 is matched to that of perishable element 22 when the outer diameter is between one and three inches (i.e., an outer radius of 0.5-inches to 1.5-inches). As the outer radius 25 is increased beyond 1.5-inches, thermal sensor 20 responds slower than that of most perishable elements. It is therefore critical to have the outer diameter of single piece of solid material 24 between 1-inch and 3-inches. Furthermore when outer diameter is greater than 3-inches, thermal device 20 will be too large to easily handle and secure inside of a refrigeration unit. Single piece of solid material 24 is preferably polyoxymethylene because this material is approve for close proximity to food, drugs and biological specimens and has a thermal mass that allows thermal device 20 to be of a convenient size as describe above.

Figure 5:
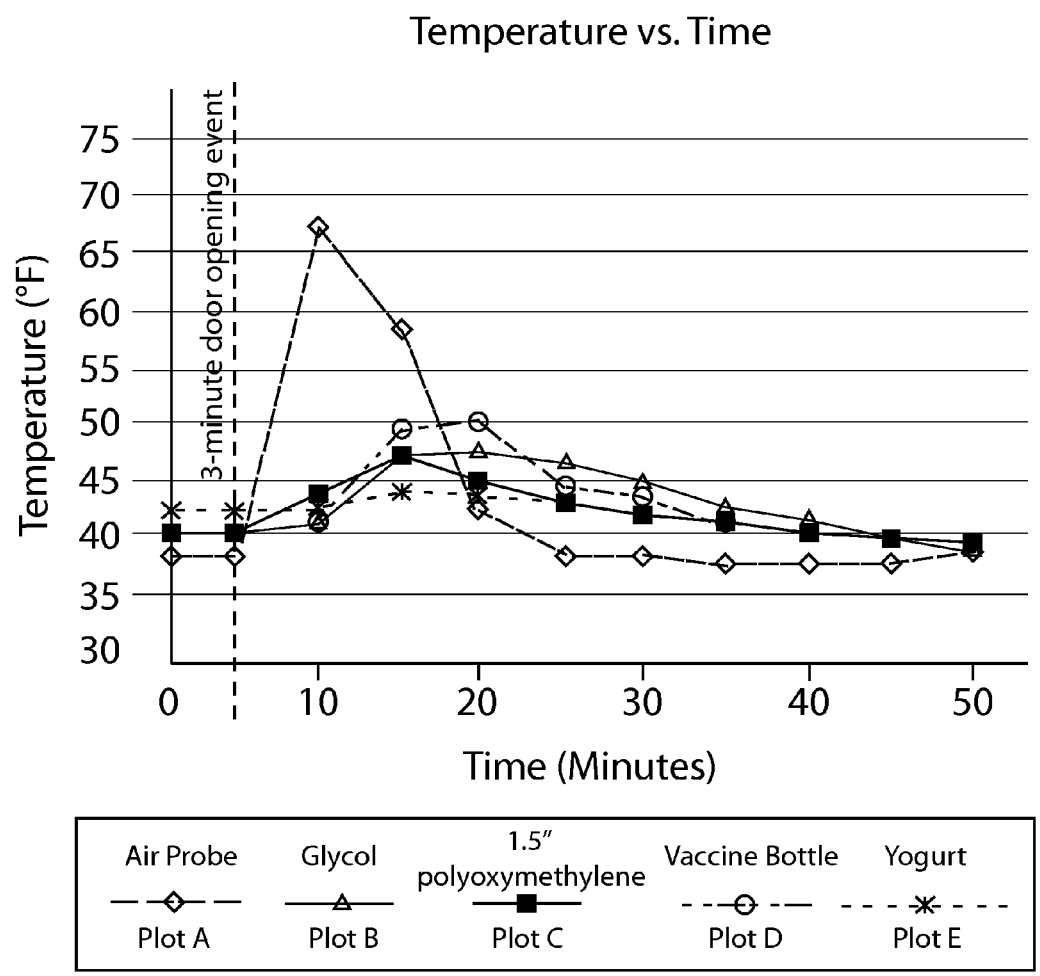
FIG. 5 is a graph showing the response time of the thermal device of FIG. 1 compared to the response times of various other thermal devices and perishable elements.

FIG. 5 is a graph of experimentally obtained thermal data showing the relative response times of various thermal devices and perishable elements. The graph shows time in minutes along the x-axis and temperature in degrees Fahrenheit along the y-axis. This data was measured in a refrigerator set to 40-degrees Fahrenheit. A 3-minute door opening event starts at 5-minutes. The air probe, plot A, shows a quick rise in temperature to almost room temperature after only a couple of minutes. The response time of the other thermal devices and perishable elements are shown to have a much slower response time. The response of a standard glycol measuring device is shown in plot B. The response time of a 1.5-inch polyoxymethylene thermal device (one variation of thermal device 20) is shown in plot C. For comparison, the temperature response of a 5 ml vaccine bottle is shown in plot D and the temperature response of a yogurt container is shown in plot E. The 1.5-inch polyoxymethylene device more accurately matches the response of the perishable elements, i.e. 5 ml vaccine bottle and yogurt, than does the glycol measuring device.

Figure 6:
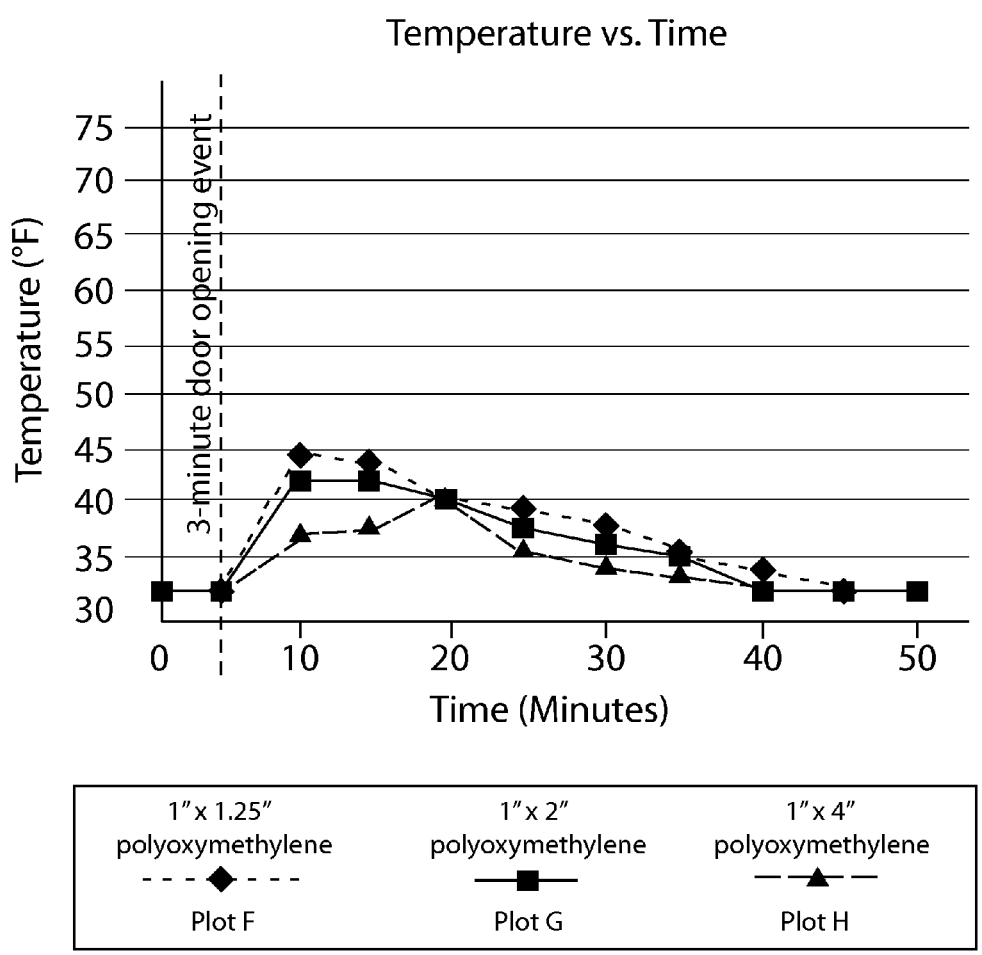
FIG. 6 is a graph showing the response time of variations of the thermal device in FIG. 1, showing the criticality of the diameter.

FIG. 6 is a graph of experimentally obtained thermal data showing the relative response times of various thermal devices all having the same radius, but different lengths. The temperature sensor 32 being located at the midpoint between the two ends of the device. The graph shows time in minutes along the x-axis and temperature in degrees Fahrenheit along the y-axis. This data was measured in a refrigerator set to 30-degrees Fahrenheit. A 3-minute door opening event starts at 5-minutes. Plot F shows the response time of a 1-inch diameter by 1.25-inch long polyoxymethylene thermal device. Plot G shows the response time of a 1-inch diameter by 2-inch long polyoxymethylene thermal device. Plot H shows the response time of a 1-inch diameter by 4-inch long polyoxymethylene thermal device. From this data, it is clear that the diameter of the thermal device 20 around thermal sensor 32 is what primarily controls the thermal response. As long as the length is equal to or greater than the diameter, it is shown that all thermal devices 20 made of the same solid material respond similarly. Therefore the diameter of single piece of solid material 24 is what is critical as measured at a location around temperature sensor 32.

Depending on the industry and the type of perishable element 22 being monitored, it may be necessary to check the calibration of each thermal device 20 at a frequency of once every couple of weeks to once every several months. Currently to ensure data being recorded is accurate, temperature monitoring devices are removed, replaced with new calibrated devices and then the old devices are either re-calibrated for reuse or thrown away. This process can be time consuming and costly. The thermal device 20 of the present disclosure allows for in situ calibration of the thermal devices requiring minimal time. Only devices found to be out of calibration are thrown away.

Figure 7:
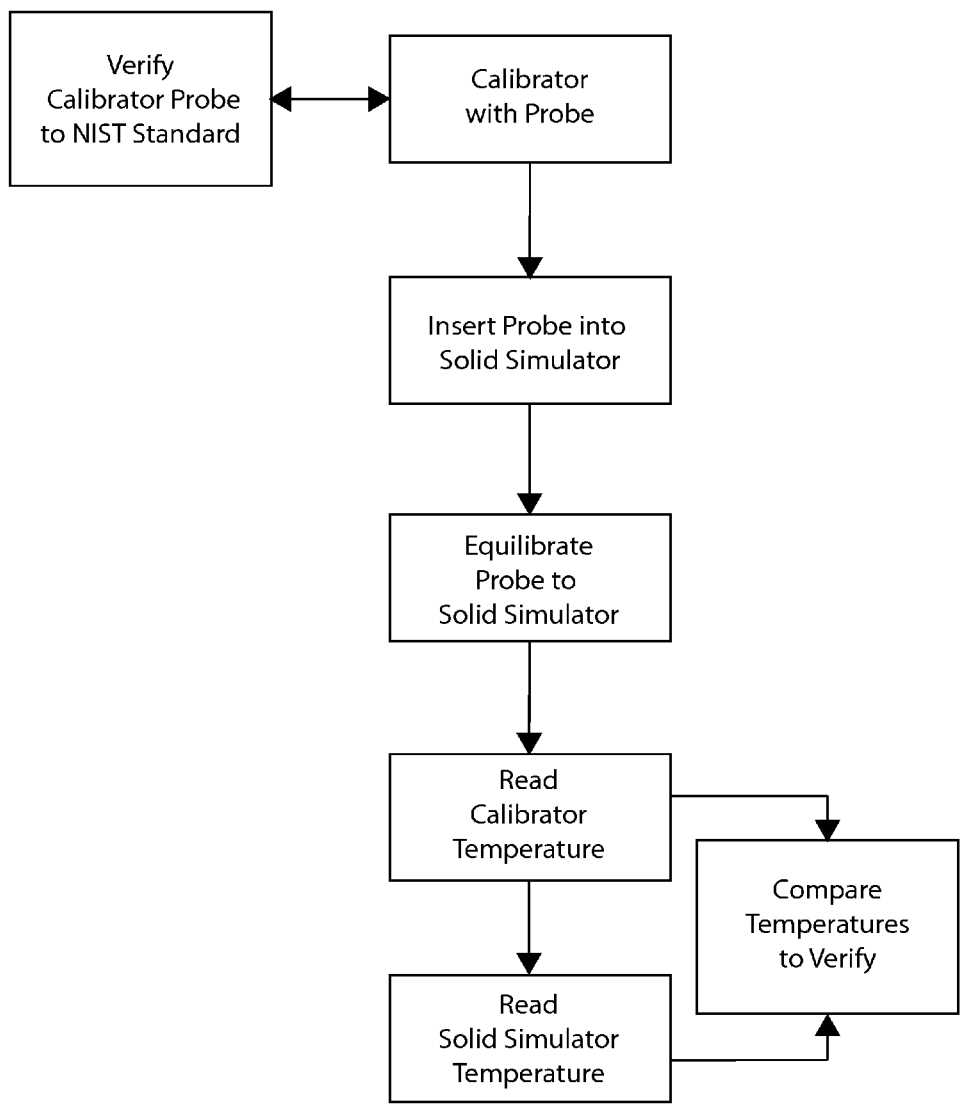
FIG. 7 is a flow chart showing a method of calibrating the thermal device in FIG. 1.

FIG. 7 is a flow chart diagramming the calibration verification procedure that is used to periodically determine the accuracy of measurements taken by each thermal device 20 in situ in the ambient atmosphere where they are being used. The procedure first requires providing a thermal device 20 having features as described above and a calibration probe. Thermal device 20 is preferably a single piece of solid cylindrical material 24 sized to have a thermal mass substantially equal to that of the perishable element. The single piece of solid material 24 has an outer surface, a centrally located temperature sensor 32 with communication leads 42 exiting outer surface 23, and calibration channel 31 extending from the outer surface to a test point within the single piece of solid material, the test point adjacent said temperature sensor. Calibrator probe 33 is a probe such as COOPER-ATKINS® thermocouple instrument and probe model 35140. Calibrator probe 33 is first verified a NIST standard. Calibrator probe 33 is then inserted in calibration channel 31 of thermal device 20. A sufficient amount of time is allowed for the temperature to equilibrate. For example, for use in a refrigerator at around 32° F., a sufficient amount of time would be approximately 1-minute. Since the tip of calibrator probe 33 is small, the probe tip does significantly effect the temperature of the thermal mass of thermal device 20 (solid simulator), and can therefore give accurate temperature readings in short times. The temperature output is read for the temperature sensor and the temperature output is read for the calibration probe. The method then involves comparing the temperature output from the temperature sensor to the temperature output from the calibration probe to determine the accuracy of temperature sensor 32. If the temperatures are more than +/−2° F. off from each other, then thermal device 20 is replaced. Calibration verification can take place in a matter of a couple of minutes at the use temperature for each solid simulator leading to cost savings over conventional temperature monitoring systems.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A thermal device for simulating and sensing the thermal characteristics of a perishable element in a surrounding atmosphere, comprising:
   a) a single piece of solid material having a center, an outer radius, a sensor end, a calibration end and a longitudinal axis;
   b) a sensing channel located along said longitudinal axis within said single piece of solid material, said sensing channel extending from said sensor end towards the center of said single piece of solid material;
   c) a temperature sensor having a thermal response time, wherein said temperature sensor is mounted within said sensing channel of said single piece of solid material;
   d) a calibration channel located parallel to said longitudinal axis within said single piece of solid material, said calibration channel extending from said calibration end towards the center of said single piece of solid material, said calibration channel terminating proximate said temperature sensor; and
   e) wherein the thermal response time of said temperature sensor mimics the thermal characteristics of said perishable element, wherein said single piece of solid material has a thermal mass substantially equal to that of said perishable element.

2. A thermal device as recited in claim 1, wherein said longitudinal axis is along the center line of said single piece of solid material, wherein said temperature sensor is positioned at said center.

3. A thermal device as recited in claim 1, further comprising a groove within said outer radius for accepting a cable tie.

4. A thermal device as recited in claim 1, wherein the outer diameter of said material is one to three inches around said temperature sensor.

5. A thermal device as recited in claim 1, wherein said single piece of solid material is at least one from the group including polyoxymethylene, polytetrafluoroethylene and polyethylene terephthalate.

6. A thermal device as recited in claim 1, wherein said temperature sensor is potted within said sensing channel.

7. A thermal device as recited in claim 1, wherein said temperature sensor is part of a thermal probe pressed within said sensing channel.

8. A thermal device as recited in claim 1, wherein said temperature sensor is at least one from the group including a Platinum RTD, a thermocouple, and a thermistor.

9. A thermal device as recited in claim 8, wherein said temperature sensor is integrated with circuitry to be remotely read.

10. A method of fabricating a thermal device for simulating and sensing the thermal characteristics of a perishable element, comprising:
    a) providing (i) a single piece of solid material and (ii) a temperature sensor having communication leads;
    b) machining said single piece of solid material into a generally cylindrical structure having a center, an outer radius, a sensing end, a calibration end and a longitudinal axis;
    c) creating a sensing channel extending from said sensing end towards the center along said longitudinal axis;
    d) creating a calibration channel extending from said calibration end towards the center parallel to said longitudinal axis;
    e) machining a groove within said outer radius for a cable tie; and
    f) securing said temperature sensor internally in said sensing channel with said communication leads extending.

11. A method of fabricating a thermal device as recited in claim 10, wherein said securing step d) includes potting said temperature sensor within said sensing channel.

12. A method of fabricating a thermal device as recited in claim 10, wherein said securing step d) includes pressing said temperature sensor within said sensing channel.

13. A method of fabricating a thermal device as recited in claim 10, wherein said machining step b) further includes machining said single piece of solid material to have a thermal mass substantially equal to that of said perishable element.

14. A method of fabricating a thermal device as recited in claim 13, wherein said machining step b) includes machining said outer radius to between one and three inches.

15. A method of fabricating a thermal device as recited in claim 14, wherein said providing step a) said temperature sensor is at least one from the group consisting of a Platinum RTD, thermocouple, and thermistor.

* * * * *